(12) United States Patent
Estlander

(10) Patent No.: US 7,966,694 B2
(45) Date of Patent: Jun. 28, 2011

(54) FOLDABLE ELECTRONIC EQUIPMENT COMPRISING A SLIDABLE HINGE INCLUDING LEAF SPRING

(75) Inventor: Peter Estlander, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 663 days.

(21) Appl. No.: 11/569,926

(22) PCT Filed: May 27, 2005

(86) PCT No.: PCT/EP2005/005695
§ 371 (c)(1),
(2), (4) Date: Oct. 11, 2007

(87) PCT Pub. No.: WO2005/120019
PCT Pub. Date: Dec. 15, 2005

(65) Prior Publication Data
US 2008/0078055 A1 Apr. 3, 2008

Related U.S. Application Data

(60) Provisional application No. 60/579,217, filed on Jun. 14, 2004.

(30) Foreign Application Priority Data

Jun. 4, 2004 (EP) .................................. 04388037

(51) Int. Cl.
*E05D 1/00* (2006.01)
(52) U.S. Cl. .................. 16/225; 379/433.13; 455/575.3; 348/333.06

(58) Field of Classification Search .................... 16/225, 16/226, 277, 286, 235, 350, 362; 379/433.13; 455/575.3; 361/679.27; 348/333.06; 267/164
See application file for complete search history.

(56) References Cited

U.S. PATENT DOCUMENTS

| | | | |
|---|---|---|---|
| 6,900,981 B2 * | 5/2005 | Kuivas et al. | 361/679.06 |
| 7,155,266 B2 * | 12/2006 | Stefansen | 455/575.3 |
| 7,380,312 B2 * | 6/2008 | Ge et al. | 16/342 |
| 7,426,406 B2 * | 9/2008 | Maatta et al. | 455/575.8 |
| 7,512,426 B2 * | 3/2009 | Maatta et al. | 455/575.1 |
| 7,593,524 B2 * | 9/2009 | Maenpaa | 379/433.13 |
| 2003/0114184 A1 | 6/2003 | Wilson | |
| 2003/0118179 A1 | 6/2003 | Barnett et al. | |
| 2008/0146295 A1 * | 6/2008 | Jorgensen et al. | 455/575.3 |

FOREIGN PATENT DOCUMENTS

| EP | 1 083 725 A1 | 3/2001 |
|---|---|---|
| EP | 1 381 207 A2 | 1/2004 |
| EP | 1 422 593 A1 | 5/2004 |

* cited by examiner

*Primary Examiner* — William L. Miller
(74) *Attorney, Agent, or Firm* — Myers Bigel Sibley & Sajovec

(57) ABSTRACT

A foldable electronic equipment comprising a first part (2) and a second part (3) that are interconnected through a hinge (4). The hinge (4) comprises at least one leaf spring (17) that is connected to the first part (2) and the second part (3) and is arranged to force the first part (2) and the second part (3) away from each other. Additionally, a camera is provided on the hinge, the camera being aligned with an opening on the hinge when the first part and the second part are forced away from each other.

19 Claims, 2 Drawing Sheets

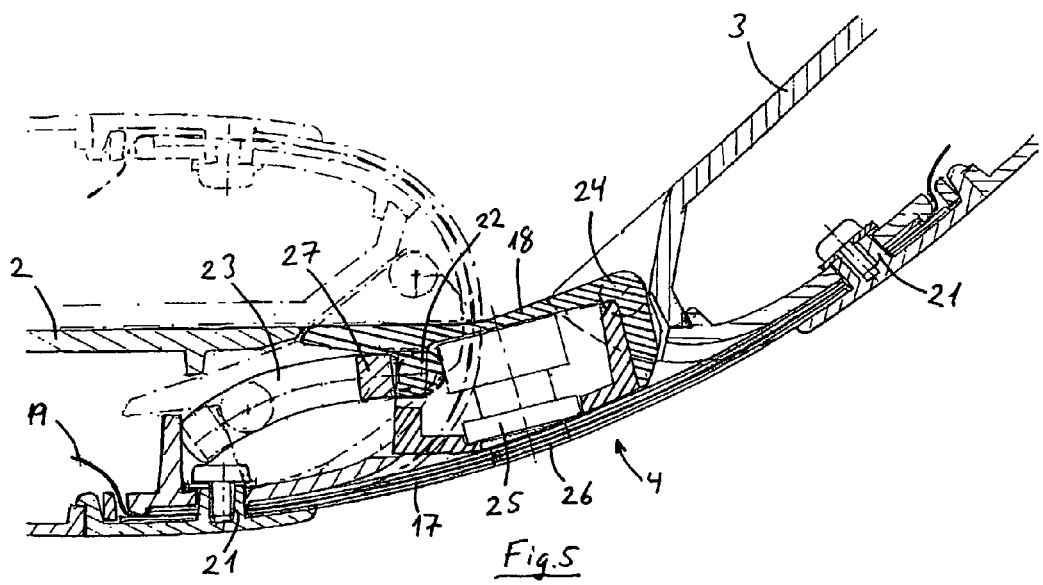
Fig. 5
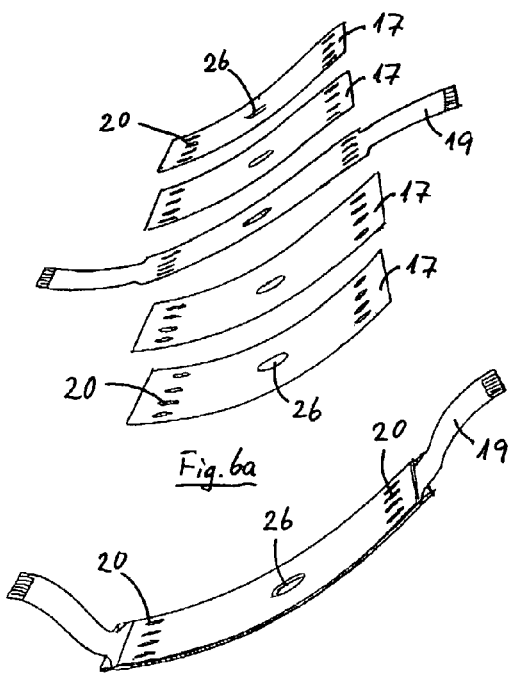
Fig. 6a
Fig. 6b
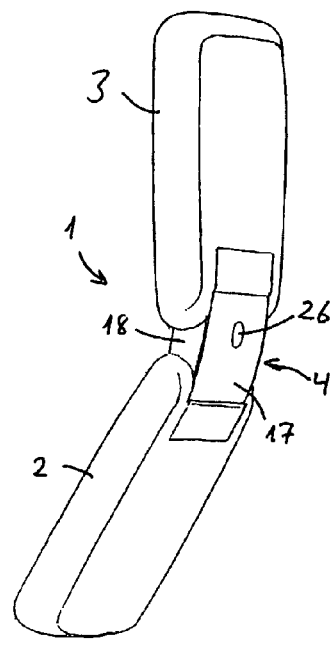
Fig. 7

FOLDABLE ELECTRONIC EQUIPMENT COMPRISING A SLIDABLE HINGE INCLUDING LEAF SPRING

RELATED APPLICATIONS

The present application is a 35 U.S.C. §371 national phase application of PCT International Application No. PCT/EP2005/005695, having an international filing date of May 27, 2005 and claiming priority to European Patent Application No. 04388037.6, filed Jun. 4, 2004 and U.S. Provisional Application No. 60/579,217 filed Jun. 14, 2004, the disclosures of which are incorporated herein by reference in their entireties. The above PCT International Application was published in the English language and has International Publication No. WO 2005/120019.

TECHNICAL FIELD

The invention relates to an electronic equipment comprising a first part and a second part that are interconnected through a hinge.

RELATED PRIOR ART

Today it is common technology to provide electronic equipment such as mobile telephones with two parts that are interconnected through a hinge arranged between the two parts. These kinds of mobile telephones are also referred to as clamshell telephones. An example of such a mobile telephone is disclosed in e.g. EP-A1-1 083 725 that shows a mobile telephone provided with a flip cover that is movable between a first position and a second position in response to a biasing force provided by an arrangement positioned in the hinge. The hinge arranged between the two parts are arranged as commonly known hinges, i.e. with protruding portions that fits between each other around a common hinge axis and with a hinge pin extending through openings provided in the protruding portions. A helical spring is arranged in the hinge for biasing the first part and the second part away from each other.

The hinge mechanisms of such prior art devices are relatively complicated and require a delicate and advanced solution in relation to electrical transmission between the two parts in order not to be fragile. Furthermore, the hinge is a dominant feature of the exterior of the telephone and from an aesthetic point of view it is desirable to make the hinge less dominant.

OBJECT OF THE INVENTION

It is therefore an object of the invention to provide an electronic equipment comprising two interconnected parts with a hinge that is less dominant to the exterior of the electronic equipment and that allows more simple means for electrical transmission between the two parts across the hinge.

SUMMARY OF THE INVENTION

The object of the invention is achieved by arranging the hinge between the two parts in such manner that it comprises at least one leaf spring that is connected to the first part and the second part and is arranged to force the first part and second part away from each other.

Thereby it is obtained that it is possible to achieve a smooth and visibly appealing outer appearance of the electronic equipment both in the folded and unfolded state thereof. Furthermore, the electrical contact between the first part and the second part need no longer be established over mutual rotating elements, but can simply follow the curvature of the leaf spring.

In a preferred embodiment the hinge comprises a hinge member arranged between the first part and the second part. The hinge member supports the leaf spring and prevents the first part and second part from twisting. Furthermore, the hinge member can be arranged to limit the maximum opening angle between the first part and the second part.

Preferably, the hinge member is arranged slidably in relation to at least one of the first part and the second part. Thereby the hinge member can be arranged to cover the gap between the first part and the second part when the electronic equipment is unfolded or opened, whereas it can be displaced into the first part or the second part when the electronic equipment is folded or closed.

The at least one leaf spring is preferably arranged on an outer side of the hinge member, such that an appealing outer appearance can be achieved.

In one embodiment the hinge member is provided with a camera, and the at least one leaf spring is arranged on an outer side of the hinge member and is provided with an opening that is aligned with the camera when the first part and the second part are forced away from each other. In this manner the camera is positioned in the hinge of the electronic equipment and does not occupy space elsewhere on the electronic equipment.

In order to ensure good performance of the biasing hinge it may be provided with more than one leaf spring.

If more than one leaf spring is used one is fixed in relation to both the first part and the second part, whereas the additional leaf springs are slidably arranged in relation to at least one of the first part and the second part. Thereby the different bending radiuses of each leaf spring are accounted for.

The electronic equipment may be a mobile radio station, such as a mobile telephone.

It shall be emphasised that the term "comprise/comprising" when used in this specification is taken to specify the presence of stated features, integers, steps or components but does not preclude the presence or addition of one or more other features, integers, steps components or groups thereof.

DESCRIPTION OF THE DRAWINGS

The invention will be described in detail in the following with reference to the drawings in which

FIG. 5 shows a cross-section through the hinge of a mobile telephone according to the invention;

FIGS. 6a and 6b show in exploded and assembled view the structure of the hinge comprising a plurality of leaf springs; and FIG. 7 shows a mobile telephone according to the invention from its outer side.

DETAILED DESCRIPTION OF AN EMBODIMENT OF THE INVENTION

Figure 1:
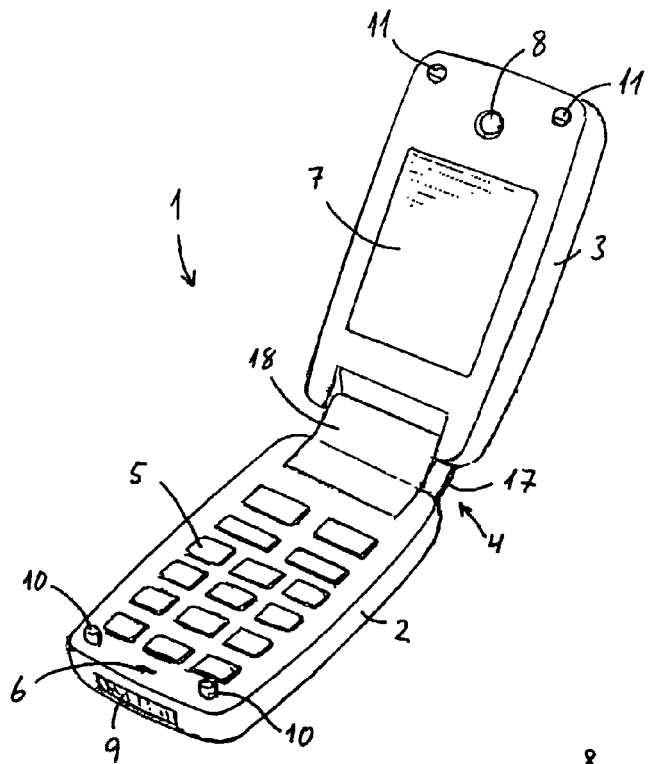
FIG. 1 shows a first embodiment of an electronic equipment in the shape of a mobile telephone.

FIG. 1 shows an electronic equipment in the shape of a mobile telephone 1 comprising a first part 2 and a second part 3 that are interconnected through a hinge 4. A mobile telephone 1 of this kind is sometimes referred to as a clamshell telephone. In the shown embodiment the first part 2 is provided with buttons 5 and a microphone 6, and the second part 3 is provided with a display 7 and a loudspeaker 8. A system interface 9 is provided at the end wall of the first part 2. All these features are generally known in relation to mobile telephones, and they will not be discussed more herein.

In order to lock and align the first and second parts 2,3 when they are in the folded position a couple of guiding knobs 10 are provided on the first part 2.

Figure 2:
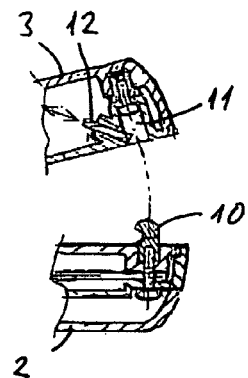
FIG. 2 shows a cross-section of a locking mechanism provided in the mobile telephone shown in FIG. 1.

The guiding knobs 10 are aligned with openings 11 provided in the second part 3. A locking device 12 (see FIG. 2) is arranged in each of the openings 11 to engage and lock the guiding knobs 10. When the mobile telephone 1 is to be unfolded as shown in FIG. 1 a release button (not shown) is pressed whereby each of the locking devices 12 releases the engagement with the corresponding guiding knob 10.

Figure 3:
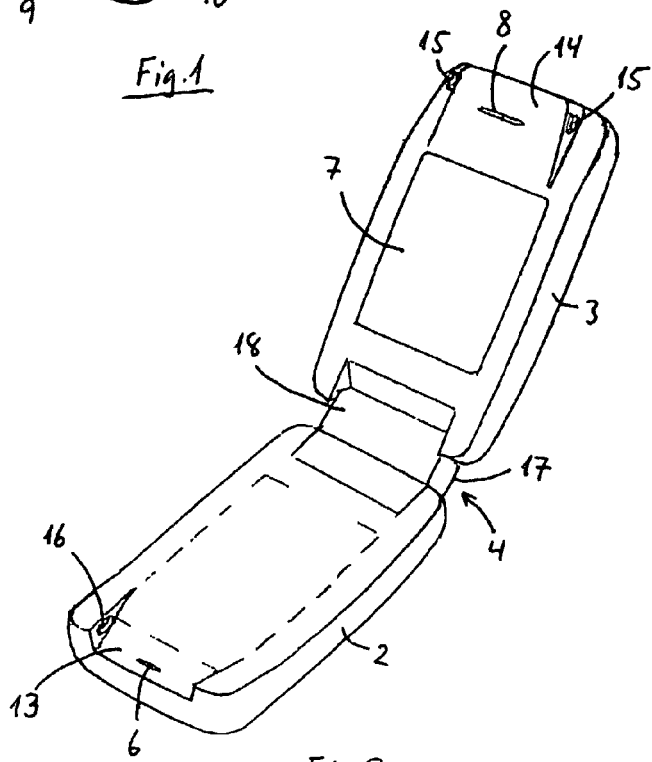
FIG. 3 shows a second embodiment of an electronic equipment in the shape of a mobile telephone.

Another manner to achieve alignment of the first part 2 and the second part 3 is to provide an indentation 13 and a complementary protrusion 14 on the first part 2 and the second part 3, respectively, as shown in FIG. 3. FIG. 3 shows a second embodiment of an electronic equipment in the shape of a mobile telephone 1. The mobile telephone 1 shown in FIG. 3 corresponds in many aspects to the mobile telephone 1 shown in FIG. 1, and the same reference numerals will be used for the same parts even if the differ in details. The mobile telephone 1 shown in FIG. 3 also comprises a first part 2 and a second part 3 that are interconnected by a hinge 4. The microphone 6, display 7 and loudspeaker 8 are also found again. The buttons shown in FIG. 1 are omitted, but may of course also be incorporated in the embodiment shown in FIG. 3.

A major difference between the embodiments shown in FIGS. 1 and 3 is the structure of the locking and aligning means. In FIG. 3 the first part 2 is provided with an indentation 13 and the second part 3 is provided with a protrusion 14 that is complementary with the indentation, i.e. it fit snugly into the indentation 13, when the mobile telephone 1 is folded. The protrusion 14 is provided with locking knobs 15 that are sideways displaceable and is adapted to engage openings 16 provided in the first part 2 at the side walls of the indentation 13. Again, as release button (not shown) is pressed in order to unlock the locking knobs 15 from the engagement with the openings 16 when the mobile telephone 1 is to be unfolded.

In either of the embodiments shown in FIGS. 1 and 3 the hinge comprises a leaf spring 17 in accordance with the invention. The leaf spring 17 is hardly visible in FIGS. 1 and 3, since it is covered by a hinge member 18 (see FIG. 4) that supports the inside of the leaf spring. The hinge member 18 is connected to the first part 2 and the second part 3 as described below and prevents the first part 2 and the second part 3 from twisting and also limits the maximum opening angle.

FIG. 5 shows a cross-section through the hinge 4 of either of the mobile telephones 1 shown in FIGS. 1 and 3. As mentioned above, the hinge 4 comprises a hinge member 18 and—in accordance with the invention—a leaf spring 17. In fact, in the shown embodiment the hinge comprises four leaf springs 17 that are arranged in pairs on either side of a flexible connector element 19—also known as a flex film—which ensures electrical contact between the first part 2 and the second part 3. This structure is shown in FIGS. 6a and 6b that show an exploded and an assembled view the structure of the hinge 4 comprising a plurality of leaf springs 17 and a flexible connector element 19.

FIGS. 6a and 6b also show that the leaf springs 17 are provided with openings 20 at each end. In FIG. 5 it is seen how these openings 20 are used to connect the leaf springs 17 with the first part 2 and the second part 3, respectively, by means of pins 21 that extend through the openings 20. One of the leaf springs 17 is firmly fixed to both the first part 2 and the second part 3 without play. The other leaf springs 17 are connected to either the first part 2 or the second part 3 without play and with the other part with play. Thereby mutual movement between the leaf springs 17 is allowed which is necessary due to the different bending radiuses of the individual leaf springs 17.

Instead of arranging each leaf spring 17 and the flexible connector element 19 individually in relation to the first part 2 and the second part 3, they may initially be assembled into one unit which is subsequently connected to the first part 2 and the second part 3.

FIG. 5 also shows how the hinge member 18 spans the gap between the first part 2 and the second part 3, when the mobile telephone 1 is unfolded as shown with solid lines. When the mobile telephone 1 is folded to its closed state, which is shown with broken lines in FIG. 5, the hinge member 18 slides into the first part 2. This is possible because the hinge member 18 is provided with sliding taps 22 that is displaced in grooves or guides 23 arranged at either side of the hinge member 18 in the first part 2. At the other end the hinge member 18 is pivotably connected to the second part 3 by means of protruding pivot taps 24 that engages complementary openings in the second part 3. The length of the guides 23 determines the maximum sliding movement of the hinge member 18 and thereby the maximum opening angle between the first part 2 and the second part 3. If a too large opening angle is allowed the structural strength and rigidity of the mobile telephone 1 may be jeopardised.

Figure 4:
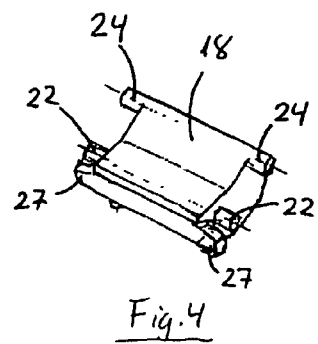
FIG. 4 shows a hinge member arranged between the two hinged parts.

To reduce the rate of motion, when the mobile telephone 1 is forced to open by means of the leaf springs 17, a friction brake is incorporated in the hinge 4. The friction brake comprises two friction taps 27 that extend outwards from the hinge member 18 and frictionally engage the guides 23 in the first part 2. The friction taps 27 is preferably made of a silicone material and are configured such that suitable friction against the guides 23 is ensured. The friction taps 27 may be provided on a separate element that is secured to the hinge member as indicated in FIG. 4.

By the structure shown in FIG. 5 is ensured that when the mobile telephone 1 is folded or closed—as indicated with broken lines in FIG. 5—the visible portion of the hinge 4 is constituted by the smooth surface of the leaf spring 17. When the mobile telephone 1 is unfolded or opened the outer surface of the hinge is still constituted by the smooth surface of the leaf spring 17, whereas the inner gap between the first part 2 and the second part 3 is covered by the hinge member 18.

In the embodiment shown in FIG. 5 a camera 25 is located within the hinge member 18. Each of the leaf springs 17 and the flexible connector element 19 is therefore provided with a central opening 26 as better seen in FIGS. 6a and 6b. In the unfolded position the camera 25 is aligned with the central openings 26 and it is therefore possible to take pictures through the central openings 26. This position is shown with solid lines in FIG. 5 and also in FIG. 7. In the folded position the hinge member 18 is displaced into the first part 2. The camera 25 is therefore no longer aligned with the openings 26 in the leaf springs 17, but is well protected behind a non-open portion of the leaf springs 17 or even within an outer shell of the first part 2. This may easily be deduced from the unfolded state shown with broken lines in FIG. 5.

The hinge member 18 may also be provided with other technical means than the camera 25. For instance, an antenna or any other electronic component may be arranged in the hinge member 18, provided that it is possible to arrange suitable electrical connections and electromagnetic shielding of the components.

The invention has been described with reference to a preferred embodiment in which four leaf springs 17 are used. However, a single leaf spring 17 may also be applicable in some embodiments and the hinge member 18 may also be omitted. Of course, the camera 25 can be omitted as well; however, if a camera is to be included in the electronic equipment it can suitably be positioned in a hinge member as shown. The electronic equipment may also be any other kind of electronic device than a mobile telephone.

The invention claimed is:

1. An electronic apparatus comprising:
   a first part and a second part that are interconnected through a hinge, wherein the hinge comprises a plurality of leaf springs arranged one on top of the other in such a way that mutual movement between the plurality of leaf springs is allowed; wherein the plurality of leaf springs are connected to the first part and the second part; and wherein the plurality of leaf springs are configured to force the first part and second part away from each other,
   wherein a first leaf spring of the plurality of leaf springs is fixed in relation to both the first part and the second part, and wherein the other of the plurality of leaf springs are each slideably arranged in relation to one of the first part and the second part.

2. The apparatus according to claim 1, wherein at least one of the first and second parts comprise electronic components configured to carry out mobile radio communications across a wireless air interface.

3. The apparatus according to claim 1, wherein the hinge further comprises a flexible connector element configured to provide an electrically conductive coupling between the first part and the second part, wherein one of the plurality of leaf springs is arranged on either side of the connector element.

4. An electronic apparatus comprising:
   a first part and a second part that are interconnected through a hinge, wherein the hinge comprises a plurality of leaf springs arranged one on top of the other in such a way that mutual movement between the plurality of leaf springs is allowed; wherein the plurality of leaf springs are connected to the first part and the second part; and wherein the plurality of leaf springs are configured to force the first part and second part away from each other,
   wherein the hinge comprises a hinge member arranged between and connected to the first part and the second part.

5. The apparatus according to claim 4, wherein the hinge member is arranged slidably in relation to at least one of the first part and the second part.

6. The apparatus according to claim 5, wherein the hinge member comprises a plurality of sliding taps and the first part comprises a plurality of guides configured to receive the plurality of sliding taps.

7. The apparatus according to claim 6, wherein the hinge member comprises a plurality of friction taps configured to frictionally engage the plurality of guides.

8. The apparatus according to claim 4, wherein the plurality of leaf springs are arranged on an outer side of the hinge member.

9. The apparatus according to claim 4, wherein the hinge member comprises a camera, wherein the plurality of leaf springs are arranged on an outer side of the hinge member, and wherein an opening through the plurality of leaf springs is aligned with the camera when the first part and the second part are forced away from each other.

10. The apparatus according to claim 4, wherein the hinge further comprises a flexible connector element configured to provide an electrically conductive coupling between the first part and the second part, wherein one of the plurality of leaf springs is arranged on either side of the connector element.

11. The apparatus according to claim 4, wherein the hinge member is arranged slidably in relation to at least one of the first part and the second part.

12. The apparatus according to claim 11, wherein the hinge member comprises a plurality of sliding taps and the first part comprises a plurality of guides configured to receive the plurality of sliding taps.

13. The apparatus according to claim 12, wherein the hinge member comprises a plurality of friction taps configured to frictionally engage the plurality of guides.

14. The apparatus according to claim 4, wherein the plurality of leaf springs are arranged on an outer side of the hinge member.

15. The apparatus according to claim 4, wherein the hinge member comprises a camera, wherein the plurality of leaf springs are arranged on an outer side of the hinge member, and wherein an opening through the plurality of leaf springs is aligned with the camera when the first part and the second part are forced away from each other.

16. An electronic apparatus comprising:
   a first section;
   a second section movably coupled to the first section; and
   a hinge configure to movably couple the first section and the second section, the hinge comprising:
   a plurality of leaf springs arranged one on top of the other and configured to move relative to one another, wherein the plurality of leaf springs are connected to the first section and the second section, and wherein the plurality of leaf springs are configured to bias the first section away from the second section,
   wherein a first leaf spring of the plurality of leaf springs is fixed in relation to both the first section and the second section, and wherein the other of the plurality of leaf springs are each slideably arranged in relation to one of the first section and the second section.

17. The electronic apparatus of claim 16, wherein the hinge further comprises:
   a hinge member that comprises a camera configured to be aligned with an opening between the plurality of leaf springs when the first section is positioned away from the second section; and
   a flexible connector element configured to provide a conductive coupling between the first section and the second section.

18. The electronic apparatus of claim 17, wherein the hinge member further comprises a plurality of friction taps configured to frictionally engage a plurality of guides configured in the first section.

19. The electronic apparatus of claim 18, wherein at least one of the first and second sections comprise electronic components configured to carry out mobile radio communications across a wireless air interface.

* * * * *